Figure 5:
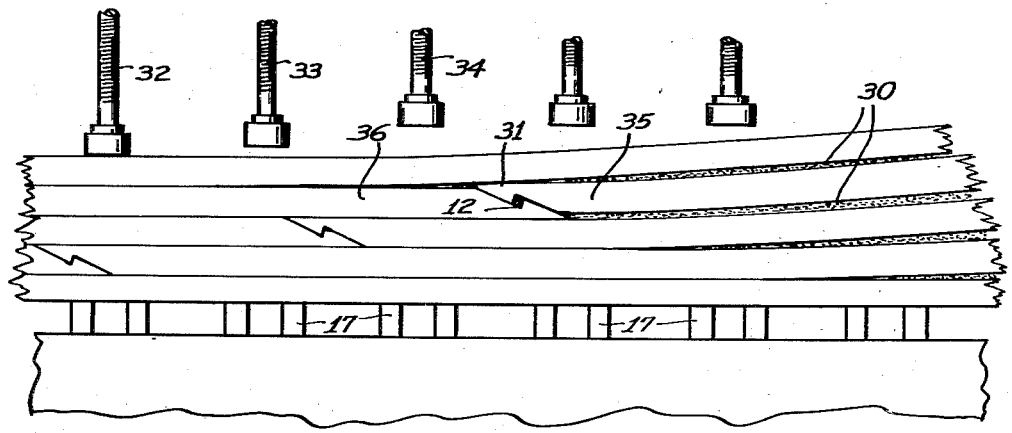

Nov. 27, 1945.  V. J. WINKEL  2,389,944
METHOD OF MANUFACTURING LAMINATED BUILDING MEMBERS
Filed Dec. 14, 1942  3 Sheets-Sheet 1
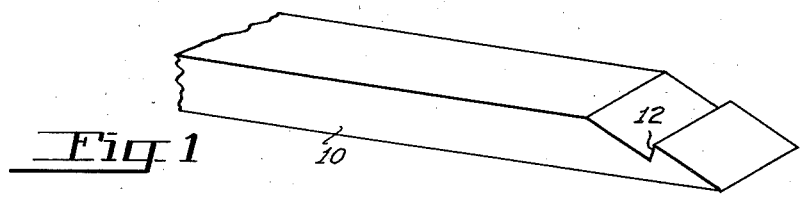
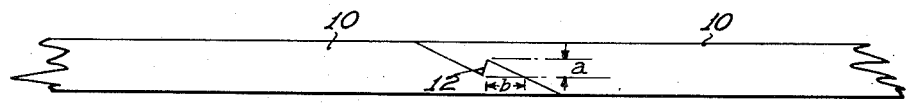
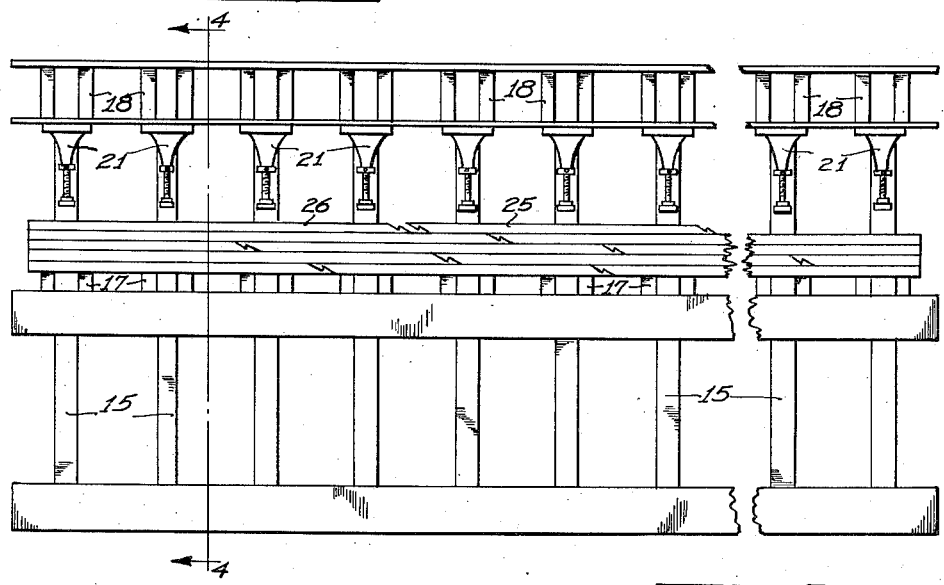
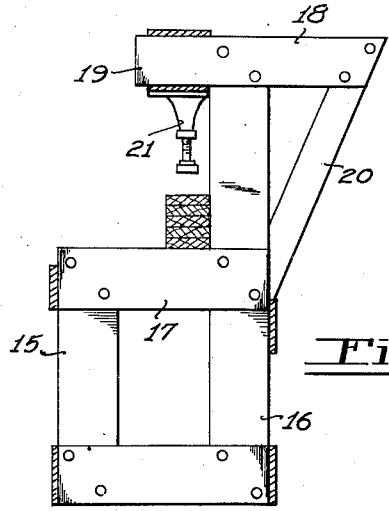
VICTOR J. WINKEL
INVENTOR
BY E. A. Buchhorn
ATTORNEY Nov. 27, 1945.　　　V. J. WINKEL　　　2,389,944
METHOD OF MANUFACTURING LAMINATED BUILDING MEMBERS
Filed Dec. 14, 1942　　　3 Sheets-Sheet 2

VICTOR J. WINKEL
INVENTOR

BY *[signature]*
ATTORNEY

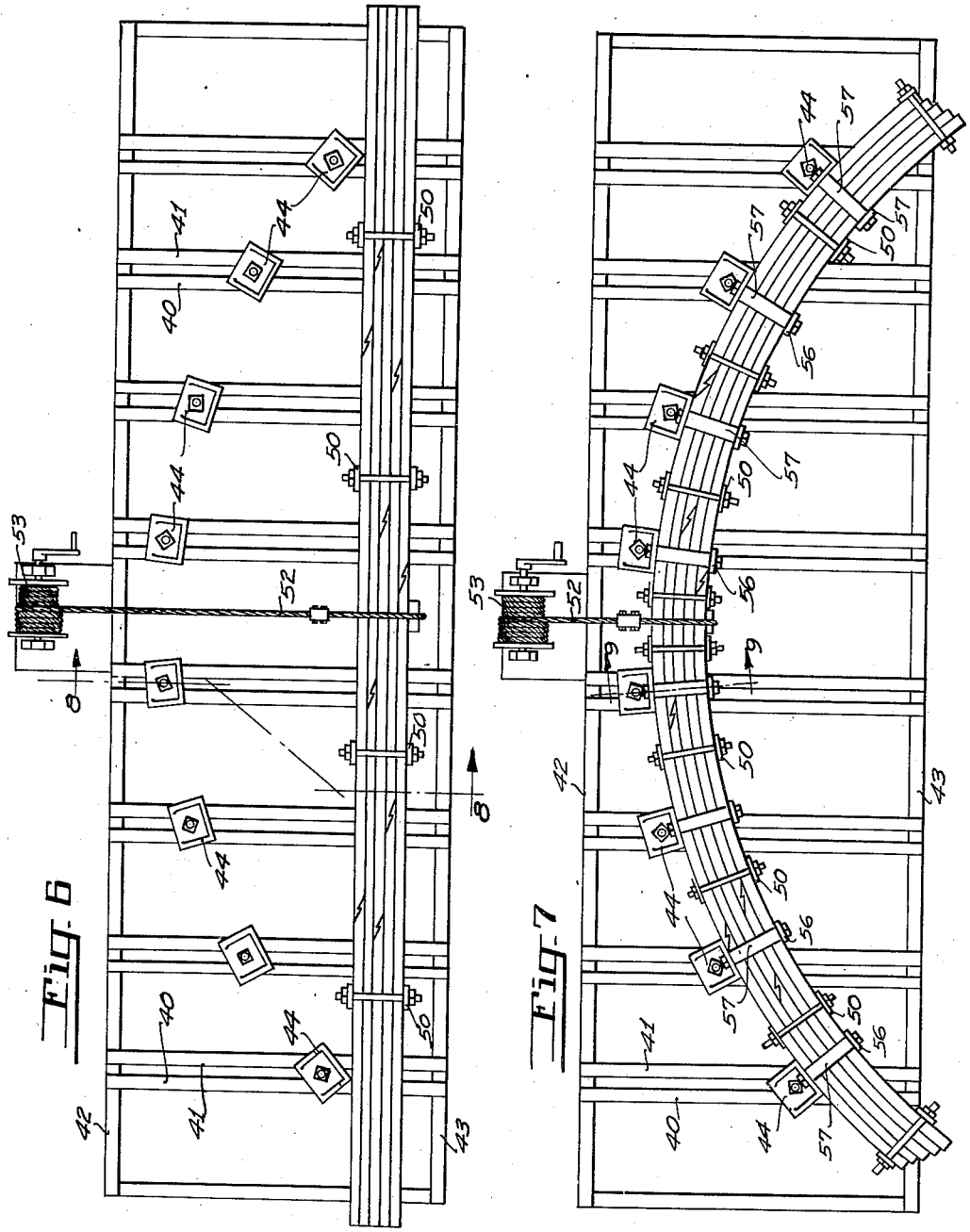

Patented Nov. 27, 1945

2,389,944

UNITED STATES PATENT OFFICE 2,389,944

METHOD OF MANUFACTURING LAMINATED BUILDING MEMBERS

Victor J. Winkel, Portland, Oreg., assignor to Timber Structures, Inc., a corporation of Oregon Application December 14, 1942, Serial No. 468,932

2 Claims. (Cl. 144—309)

The present invention relates to laminated structural units, such as beams and arches, particularly suitable for use in building construction, and to methods for manufacturing such units.

In the fabrication of laminated structural units, particularly those of long lengths, it is necessary to employ boards of relatively short commercial lengths and which are laid up in a plurality of layers, each layer being comprised of a number of pieces arranged in an end to end relation. In building up beams and the like, boards of a relatively thick dimension, that is, greater than one inch, are usually employed so that the thickness of each layer represents a considerable portion of the beam cross section. It is necessary, therefore, to join together the adjacent ends of the boards of each layer in order that the strength of the unit will not be lessened at such points. It will be readily understood that if the boards are assembled together in each layer with squared ends abutting each other and, even though glue may be applied between such ends, a bond of high strength cannot be effected therebetween so that the cross section of the unit will be materially weaker at such points through the solid sections of the unit. For this reason, it is preferred to oppositely taper the adjacent board ends which, when glued together, will form a long tapered joint therebetween of high strength. Unless the tapered end surfaces of the boards are held tightly together during the period that the glue is setting a firm bond will not be obtained.

For reasons of manufacturing expediency and economy it is desired to glue together the adjacent overlapping board ends of each layer in the same operation that the facing surfaces of the various layers are glued together. It is a usual practice to run the boards separately through a glue spreader to apply the glue to the opposite sides and ends of the boards and which are assembled upon a clamping table in an end to end relation completing one layer at a time to the desired length and building up as many layers as may be required. After the requisite number of layers of boards have been stacked, pressure is then applied either by means of a press arrangement or by clamps and pressure is maintained upon the stack until after the glue is set. While the application of pressure at right angles to the outer surfaces will effect a tight bond between the adjacent side surfaces of the boards it is difficult to insure that sufficient pressure will be applied between the overlapping tapered ends of the boards for forming a tight bond between such portions. In the assembling operation the adjacent tapered board ends will be separated from each other by a distance corresponding to the thickness of the layers of glue applied to each. As pressure is subsequently applied normal to the surfaces of the flat sides of the board only a slight pressure will be exerted between the tapered board ends sufficient perhaps to force some of the excess glue from the space therebetween while the remaining glue will still separate the wood fibers of the board ends and preclude a tight bond from being formed therebetween. If, on the other hand, when assembling the boards of each layer the adjacent ends are overlapped by an amount slightly greater than the length of the taper, then as pressure is applied to the opposite sides of the completed stack, the ends of the boards may be brought together in an intimate contacting relation because the layers will be slightly thicker at the points of overlap. If the overall length of the layers is relatively short and does not include too many joints the application of pressure may cause a sufficient longitudinal slippage of the boards outwardly from the center of the stack so that there will be substantially no overbuild of the layers at the joints and the thickness of the layers will be uniform throughout. However, if the boards are relatively wide, or the layers relatively long so that the frictional resistance to longitudinal movement will be greater than the force tending to cause such slippage, the boards will not adjust themselves and an overbuild will result at the joint preventing the desired intimate contact between the flat surfaces of the boards on the opposite sides of the joint. This may be controlled to a certain extent by the exercise of skill in guaging the amount of excess overlap in the assembly of the layers but, even so, uniformly good results cannot be expected with this procedure. Furthermore, the amount of excess overlap would have to be varied in accordance with the distance of the joint from the end of the stack, its relative position in the pile, the consistency of the glue, the surface condition of the flat sides of the boards and numerous other factors. Obviously such procedure does not lend itself to manufacturing efficiency.

Another procedure is to pile up the glue coated layers of boards and to apply the clamping pressure slowly while simultaneously hammering upon the outer ends of the boards of each layer of the stack with a sledge to drive them in toward the center to cause a tightly fitting engagement of the overlapping ends of the boards.

While this procedure, if skillfully followed, may be effective to secure the desired results in case the layers include only a single overlapped joint each it is unsatisfactory if each layer includes a greater number of joints. Blows from the hammer of such force as might cause movement of all of the various overlapped ends into engagement with each other merely result in excessive sliding movement between the pair of overlapping board ends nearest the outer ends of the stack and overbuilding at such points to wedge apart the adjacent boards on the opposite sides of the joint. The frictional resistance to sliding movement of the inner boards is too great to permit them to be moved by this manner into a tightly fitting relation.

It has also been proposed to nail the overlapping ends of the boards together as they are laid up in a stack and thus fix them in a proper overlapping relation so that when pressure is applied to the assembled stack by the clamping means, a tight bond is formed between the adjacent board ends simultaneously with the gluing of the various layers. It is a very messy operation to drive nails manually into the glue coated boards while the presence of the nails scattered throughout the unit is undesirable from the standpoint of hampering further manufacturing operations upon the unit, such as sawing or drilling, which may be required for the attachment of other members or elements to these units in the construction of a building.

Because of the difficulties and disadvantages mentioned above with respect to the various known methods of joining together the component boards of the layers in the same operation as the various laminae are glued up, the method commonly used heretofore has been to first form each layer separately. The tapered ends of a number of boards would be glued together to form a long continuous lamination and, after the joints were thoroughly set, they would be dressed down and a suitable number of such laminations would be glued together to form the beam. Such a procedure requires an exceedingly large amount of equipment in the form of assembly tables and clamping arrangements or presses since the pressure must be maintained on each joint of the entire lamination until the glue is thoroughly set. The building space required for handling and storing large numbers of separate laminations is obviously excessively great. Not only because of the large outlay in equipment, but also because of the abnormally large number of additional handling steps involved, the cost of each structural unit so constructed is accordingly very great.

In accordance with the present invention, laminated wooden structural members comprising a plurality of layers, each layer formed of a number of short sections, may be glued up in a single operation with the ends of the boards of each layer securely and uniformly bonded together in close, intimate contact while the various layers are likewise bonded together throughout their full extent. An important feature of the present invention resides in the milling of the ends of the boards in such a manner that they may be readily assembled and so that the board ends are automatically self-aligning with the requisite degree of overlapping to insure tightly fitting engagement between the board ends and without resulting in any buildup at the joints to cause separation of the layers at such points. The milling of the board ends for carrying out the present invention does not entail the provision of costly manufacturing equipment or require any more labor than that needed for providing a conventional flat taper on the ends of boards.

It is, therefore, an object of the present invention to provide a new and improved wooden laminated structural building unit comprised of relatively short lengths of lumber, and which unit is of high strength and of low cost manufacture.

A further object of the present invention is to provide a new and improved laminated structural unit comprising a plurality of layers of wooden members, one or more of the layers being formed by a plurality of relatively short wood pieces, the adjacent ends of said short pieces being so shaped that they may be readily assembled and glued together in a closely fitting overlapping relation simultaneously with the gluing together of the various layers of the unit.

Another object of the invention is to provide a structural building unit comprising a plurality of laminations rigidly bonded together, one or more of the laminations being formed by a plurality of relatively short pieces arranged in an overlapping, interhooked, end to end relation, the end surfaces of the individual pieces being glued together in the same operation with the gluing together of the various laminae.

An additional object is to provide a new and improved method of manufacturing wooden laminated structural building units with relatively short pieces of lumber.

A still further object of the invention is to provide a new and improved method of manufacturing wooden laminated structural building units of the type described which involves relatively few steps, requires a minimum of equipment and handling space and facilitates the production of such units in a relatively short length of time and at low cost.

In accordance with the present invention, boards of desired thickness and width and of random length are first milled flatwise at their opposite ends so as to provide a relatively long taper having a transversely extending step or shoulder in the center thereof. The step is so formed in the tapered end of the board as to face rearwardly, that is, away from the tip end and is of a considerable height as regards the thickness of the boards. The step is substantially exactly centered in the tapered end surface so that when two similarly milled ends of two adjacent boards are overlapped the two shoulders will fit behind each other and effectively hook them together to preclude endwise separation thereof.

The opposite sides and ends of the boards are then coated with a suitable adhesive, such as glue, and stacked up layer by layer. The overlapping of the opposite ends of the board can be readily accomplished by virtue of the stepped ends and which will automatically fit together in a proper relation so that when pressure is applied to the assembled stack, the ends of the boards will be brought together in a closely contacting relation without causing any overbuild of the layers at such joints and permitting the layers to be glued firmly together throughout their full extent.

For a consideration of what is believed new and patentable, attention is directed to the following description and the accompanying drawings while the features of novelty will be pointed out with greater particularity in the appended claims.

Figure 10:
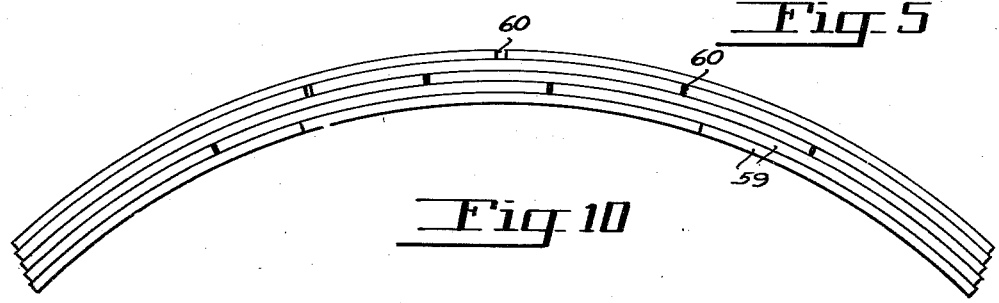
Figure 8:
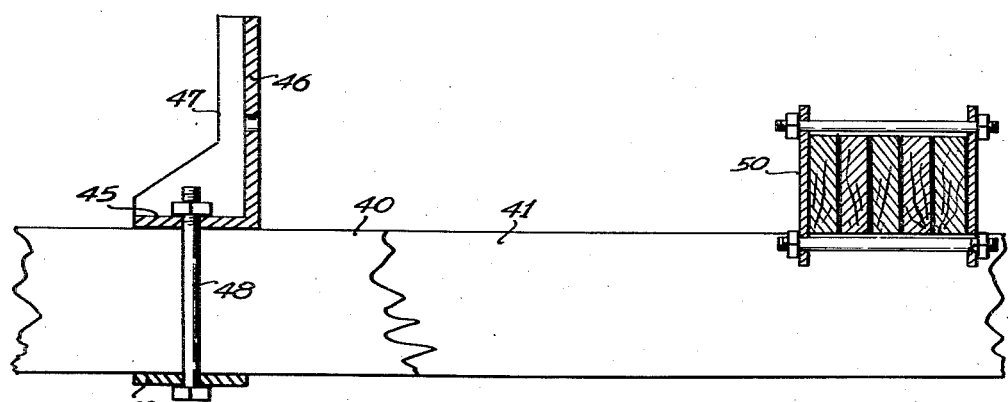
Figure 9:
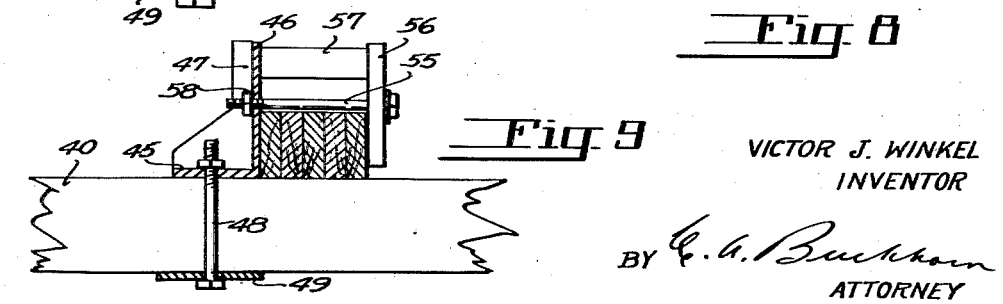

In the drawings, Fig. 1 is a view in perspective illustrating the end of a board milled for use in a beam unit according to the invention; Fig. 2 is an edgewise view of a pair of adjacent ends of boards milled as shown in Fig. 1 and fitted together in an overlapping, end to end relation; Fig. 3 is a front elevation of a clamping table illustrating a step in the assembly of a beam unit; Fig. 4 is a cross-sectional view taken along the line 4—4 of Fig. 3; Fig. 5 is an explanatory diagram illustrating a further step in the manufacture of a laminated structural unit; Fig. 6 is a plan view of a clamping table and illustrating certain steps in the manufacture of a curved laminated structural building unit in accordance with a modification of the invention; Fig. 7 is a plan view similar to Fig. 6 but illustrating a further step in the manufacture of a curved unit; Fig. 8 is a cross-sectional view taken along the line 8—8 of Fig. 6; Fig. 9 is a cross-sectional view taken along the line 9—9 of Fig. 7; and Fig. 10 is a diagrammatic view explanatory of certain functional features of the present invention.

In accordance with the present invention, boards of a predetermined thickness and width are selected with which it is desired to form the laminated structural units. As shown more clearly in Fig. 1, the ends of the boards 10 are first cut, or milled, at a tapering angle sidewise of the board. While the exact angle of the cut may be varied as desired, it is preferred, for reasons as will be more fully explained hereinafter, that it be of the order of 20 to 30 degrees. A transverse shoulder or stop 12 is formed in the center of the end surface which shoulder faces rearwardly of the board, that is, away from the tip end. The angular relation of the face of the shoulder 12 to the angle of the end surface or to the flat sides of the board will also be described later. The shoulder forms a step dividing the end surface of the board into two sloping parallel plane surfaces of substantially identical area displaced by a distance equal to the effective height of the shoulder. With the shoulder 12 formed centrally in the end surfaces, two similarly cut ends of two boards placed end to end may be overlapped in a perfectly fitting relation as is illustrated in the edge view of Fig. 2.

Referring to Fig. 2, it will be observed that the overlapped ends are effectively hooked together by the engagement of the abutting shoulders 12 so that when so arranged relative longitudinal separation of the boards will be substantially precluded. The effective height of the shoulders, that is, as projected upon a reference line drawn at right angles to the sides of the boards and indicated by the reference character $a$ is preferably equal to approximately one-third of the thickness of the board. The inverted V-shaped ridge portion of the board end will be firmly united with the remainder of the board with a relatively long shear line along the grain of the wood extending from the bottom of the shoulder to the outer sloping surface as indicated by the distance $b$. It will readily be understood that if the length of the shear line $b$ were relatively short, then the shoulder forming portions might be sheared off even under a relatively light force tending to cause relative longitudinal separation of the boards. With the shoulders of such a height as stated, a considerable thickness of wood extends continuously to the outermost surface portion of the board ends so that when the joint is finally formed it will possess a high degree of strength. Attention is also directed to the fact that the total thickness of the overlapped ends is substantially the same as the thickness of the remainder of the boards with no overbuild.

Referring now to Figs. 3 and 4 it will be explained how boards having ends milled as described may be assembled for forming laminated beam units. The opposite sides and end surfaces of the boards are first coated with a suitable adhesive by any convenient means and piled up in layers in an overlapping end to end relation. The boards may be assembled directly upon the bed of a press by means of which pressure may be applied to the completed stack and maintained until the glue has set.

While other press arrangements may be employed for use in the gluing up operation, that illustrated comprises a bench including front and rear uprights 15 and 16, respectively, and transverse, edgewise arranged members 17 defining a horizontal table surface. The rear uprights 16 extend upwardly above the table surface and to the upper ends of which are secured horizontal members 18, the front ends 19 of which overhang the table surface while the rearwardly extending ends are suitably braced as by members 20. Suitable longitudinal stringers tie the various transverse sections described together in a suitably spaced relation. Secured to the underside of the overhanging ends 19 and depending downwardly therefrom are a plurality of relatively closely spaced pressure applicators or screw jacks 21.

The assembly of the various layers of boards is greatly facilitated by the scarfs in the tapered ends of the boards. In piling up the stack the average workman will usually deposit his glue covered board only in an approximately correct position upon the underneath layer and then slide his particular board backwards or forwards, as may be required, until the ends of the boards are interfitted. For example, in Fig. 3 is shown a partially completed assembly of boards including one board 25 which has been deposited upon the pile but spaced somewhat from the adjacent end of the last previously laid board 26. Without picking up the board 25 he need only slide it toward the board 26 whereupon the sloping end surface of the board 25 will readily slide upwardly upon the sloping end surface of the board 26. As the edge of the shoulder on the tapered end of board 25 clears the edge of the corresponding shoulder of board 26, the forward end of board 25 will suddenly drop downwardly, which movement can be felt through the hands of the workman standing at the remote end of the board 25, making it unnecessary for him to visually inspect the overlapped joint to determine that the ends are properly hooked into each other. It is relatively unimportant whether he pushes the board 25 too far forwardly so as to cause an overbuild at the overlap since any such defect will be automatically corrected in a subsequent step.

After a desired number of layers of boards have been assembled in the manner described, they are first tapped rearwardly of the table surface into engagement of the forward surfaces of the rear uprights 16 for the purpose of squaring up the stack. The screws of the jacks 21 may then be lowered into engagement with the upper surface of the stack and pressure applied thereto. Pressure is applied to the assembled stack progressively along the length thereof. The purpose of this procedure may be more readily explained with reference to the exaggerated explanatory diagram of Fig. 5 which illustrates a portion of the stack upon the press table. It will be obvious that before the pressure is applied the various layers of boards will be separated from each other by a layer of glue filling the various spaces therebetween as indicated at 30. Moreover, some or all of the joints between the ends of the boards of each layer will be overlapped an excessive amount as indicated at 31. This excessive overlap may result from the laying-up procedure, as described above, or from an excessive quantity of glue in the space between the facing surfaces of the shoulders on the milled ends. The latter occurrence will be common because of the fact that the groove at the bottom of the shoulder will tend to be filled with glue during the glue application procedure. As shown, the jack screw 32 has been lowered into pressure engagement with the upper surface of the stack while all of the remaining jack screws to the right of 32 are still in the elevated condition. As the jack screws 33 and 34 are in consecutive order brought down upon the upper surface of the stack, the sloping surface of the end of the board 35 is caused to slide downwardly on the matching end surface of the adjacent board 36. Since the board 36 is held rigidly in place by the pressure applied through the jack screw 32, the board 35 is forced to move longitudinally to the right end which is possible by virtue of the fact that none of the jack screws to the right of 34 have as yet been brought into engagement with the upper surface of the stack. It will readily be understood that if some jack screw on the right end of the stack had been brought down into engagement therewith prior to the screws 33 and 34 then longitudinal movement of the board 35 would be precluded resulting in an overbuild at the joint 31 while the layers of boards on the opposite sides of 35 would be separated from those forming joint 31. This would result in the formation of a weakened section of the structural unit ultimately produced.

On the other hand, with the pressure applied to the stack in the manner described glued bonds of maximum strength are assured at each and every joint of the structural unit. By virtue of the shoulders or stops 12 provided on the ends of the boards a substantially intimate contact of the entire end surfaces is secured with the application of pressure. Upon the engagement of the shoulders with each other further relative endwise movement of the boards during the clamping operation is prevented. It will be obvious that if the shoulders were omitted, boards, such as 35, would be driven endwise leaving a heavy layer of glue between the sloping surfaces while little or no pressure would be applied to the joint surfaces by the jack screws and a very weak bond would be effected. Since the force tending to drive the board 35 endwise away from the adjacent board 36 is substantial, the shoulders 12 are formed in rugged proportions so that the shear strength thereof will adequately resist such forces when the adjacent ends are brought together in full registry with each other. It will be understood, of course, that the excess glue will be forced both endwise and laterally from the various spaces between the boards during the clamping operation.

It will be obvious that the application of pressure to the assembled stack by means of the screw jacks or other clamping means need not necessarily be started at one end since it may equally well be started at any other convenient point. Thus, for example, a screw jack in the center of the press may be the first one to be tightened down upon the stack and the remainder lowered into clamping position in consecutive order from the center outwardly to the opposite ends. After the glue is set, the unit may be removed from the press and allowed to dry for a further period, if necessary, after which it may be surfaced and trimmed and otherwise made ready for use. Particular attention is directed to the fact that in the procedure described, in which the entire unit is glued up in a single operation, the glue film between the overlapping ends of the boards of each layer is homogeneous with the glue film between the adjacent layers. The finished unit is thus structurally distinguishable from a unit in which the laminations are preformed individually, in which case the glue film between the ends of the boards is not homogeneous with the glue film between the adjacent laminations.

The invention has been thus far described with particular reference to the formation of a straight beam unit. A further modification of the invention will now be described with particular reference to Figs. 6 to 10, inclusive, which illustrate a curved beam unit and the procedure followed in the manufacture thereof.

Referring particularly to Fig. 6, a plurality of layers of boards, having their ends milled as previously described, are assembled on a forming table. The table, supported on suitable uprights (not shown), has a horizontal surface defined by a plurality of pairs of edgewise arranged beam members 40 and 41 which are spaced slightly apart and rigidly secured at their opposite ends to the longitudinal side frame members 42 and 43. Adjustably secured to the respective pairs of beam members 40, 41 are stops 44 which extend upwardly from the upper surface thereof. Referring to the left hand portion of Fig. 8, the stops 44 each comprise a base portion 45 adapted to extend across the upper surfaces of the corresponding pair of beam members 40, 41 and a vertically extending face portion 46 which is rigidly secured to the base 45 and further braced thereto by web portions 47. Each of the stops 44 is adapted to be rigidly secured to the beam members by means of a clamping bolt 48 which extends through the lower plate 49 and upwardly between the beam members and through an opening of the stop base 45. The various stops 44 are adjusted upon the table in an arcuate configuration corresponding to the curvature into which it is desired to form the structural unit.

A stack of a plurality of layers of glue-coated boards is assembled upon the forward portion of the table in much the same manner as previously described except in an edgewise relation with respect to the table surface. The assembled stack of boards is first loosely clamped together by a plurality of suitably spaced clamps 50 which may be of any suitable form, such as the bolt and bar arrangement illustrated more clearly in the right hand portion of Fig. 8. A cable 52 is then attached to the center of the assembled stack and which cable is attached at its other end to a suitable winch drum 53 arranged at the rear of the table and suitably anchored with respect thereto. The cable 52 is then wound up by the winch until the stack of boards is drawn back against the face of the stops 44. It will be obvious that the stack may not engage squarely with the faces of all of the various stops but to give the unit the desired curvature, it is first clamped by suitable means to each of the respective stops such as in the manner shown more clearly in Fig. 9. Referring to Fig. 9, a bolt 55 extending through a lever bar 56 is arranged over the top of the stack and further extends through a co-operating opening in the face 46 of the stop 44. A spacer member 57 is arranged between the upper end of the bar 56 and stop 44. Upon tightening of the nut 58 on the bolt 55, the stack of boards will be clamped against the face of the respective stops and brought into the curvature defined thereby.

The function of the interlocked ends of the individual boards of the various laminae in the bending operating of the stack will now be described. Referring to the explanatory diagram of Fig. 10, it will be observed that as a stack of boards 59 having their ends merely butted together are bent from the straight to the curved position, the adjacent board ends will tend to separate by varying amounts from the second to the outermost layer as indicated by the spaces 60 between the ends of the boards of the various laminae. This is due to the fact that the radius of curvature of the outermost layer is greater than that of the innermost layer. With the ends of the boards milled and interhooked in accordance with the present invention endwise separation of the individual boards of the layers during the bending operation is positively precluded. In order to permit the requisite slippage between the surfaces of the adjacent layers, the clamps 50 applied about the stack prior to the bending operation are not tightened but purposely left loose. These clamps are applied merely for the purpose of holding the various laminae together during the bending thereof.

For reasons analogous to those previously described in greater detail the clamping operation in this instance is also started at one point and worked progressively therefrom lengthwise of the stack. By virtue of the fact that the cable 52 arranged around the center of the stack and drawing the stack into engagement with the next adjacent stops exerts a relatively great clamping force across the various laminae at the center of the unit, it is preferred to start the clamping up procedure from this point rather than at one or the other of the ends. Thus the stack may be first clamped by bolts 55 against the table stops on the opposite sides of the cable 52 and then to the remaining stops in progressive order to the opposite ends of the table.

As the stack is given the proper curvature by being clamped into engagement with the various stops, the portable clamps 50 may then be securely tightened. It is preferred that these clamps be tightened about the stack in the same order and in simultaneous progression with the clamping of the stack against the stops 44 by the bolts 55. While the clamped up stack may be left upon the table until the glue sets, it will be obvious that the table will thus be tied up for a considerable period of time before another curved beam member can be formed thereon. It is preferred that the various clamps 50 be portable, that is, that they be not attached in any way to the forming table. A sufficient number of such clamps are applied about the assembled stack after it has been formed against the stops 44 so that the stack may be retained in the curved condition solely by the pressure exerted upon the laminae by the clamps 50. Then the bolts 55 may be removed releasing the unit from the stops 44 and the cable 52 disconnected permitting the removal of the clamped unit from the forming table and its transfer to a storage space where the glue may be permitted to set before the portable clamps 50 are taken therefrom.

The finished curved arch units, like the straight beam units previously described, will have the end surfaces of the individual boards making up the various laminae securely bonded together in a substantially intimate contacting relation by a glue film homogeneous with the glue film between the various layers. The adjacent surfaces of the various laminae will also be firmly bonded together throughout their full extent by virtue of the fact that, as in the case of the straight beam units, there will be no overbuild at the joints tending to cause a spaced relation of the laminae in the vicinity of such joints.

While the angle of the taper or bevel provided on the board ends may be varied considerably, it is pointed out that the angle of the shoulder 12 should be nearly at right angles to the opposite flat sides of the boards. The reason for this is to prevent the interfitted board ends from tending to separate by slippage of the shoulders upwardly on each other when forces are imposed upon the boards during the clamping or bending procedure tending to move the boards longitudinally apart. Such forces are particularly great when forming curved beam members as described above with reference to the explanatory diagram of Fig. 10. As shown in Figs. 1 and 2, the shoulder 12 is inclined somewhat with respect to the true perpendicular of the flat sides of the board, but it will also be noted that the angle thereof with respect to the planes of the adjoining tapered surfaces is substantially less than 90 degrees. If a taper were provided on the board ends longer than that shown, then the shoulder 12 might be made at right angles with respect thereto. In any event, the angle of the shoulder should be such that there will be no tendency for the engaging shoulders of a pair of interhooked boards to climb upwardly upon each other during the beam manufacturing procedure.

The milling or formation of the stepped tapered surfaces on the ends of the boards to be used in making laminated structural building units in accordance with the present invention involves no additional labor expense over that required for providing a smooth, flat taper on the board ends. The milling operation can be performed with a single pass of a suitably designed cutter head on a woodworking tool and which tool may be of a relatively inexpensive construction.

The use of nails for securing the ends of the boards together is entirely eliminated and the assembly procedure is reduced to one of great simplicity and which may be carried out even with unskilled labor.

An outstanding feature of the present invention resides in the fact that the building units may be assembled and glued into a solid laminated unit, either straight or curved, in a single operation as distinguished from the procedure of first gluing up each of the individual laminae and, secondly, gluing up a plurality of such laminae.

In the foregoing specification and in the following claims the term "sides" refers to the wider faces of the boards or wood sections as distinguished from the term "edges" which refers to the narrower faces thereof. These definitions are in accordance with common usage in the art. Also, the tapering surfaces provided on the ends of the boards or wood sections and which face in the same direction generally as the wider faces or sides of the boards, as shown in Fig. 1, are defined simply as extending "sidewise" of the boards or wood sections as distinguished from extending edgewise thereof.

Having described the principles of the present invention in what are considered to be preferred embodiments, it is desired that it be understood that the specific details as to both the structure and procedure as set forth are merely illustrative and that the invention is not to be necessarily so limited. It is intended in the following claims to cover all such obvious modifications as fall within the true spirit and scope of the instant disclosure.

What I claim is:

1. The method of manufacturing a relatively long unitary laminated member including at least one lamination comprised of a plurality of relatively short wood sections arranged in an end to end relation, said method comprising the steps of forming a pair of parallel tapered surfaces with a shoulder therebetween on the adjacent ends of said sections, said shoulders being centrally disposed on the end surfaces of said sections and facing away from the adjacent end of the corresponding section whereby the end portions of said sections are complementary with respect to each other, said tapered surfaces extending sidewise of said sections, applying adhesive to the adjacent end surfaces and to the sides of said sections including the adjacent sides of the remaining laminations, assembling in a superimposed relation a plurality of laminations including said one lamination comprised of said wood sections with said adhesive between adjacent end surfaces of said sections and between adjacent laminations in the unset state, the tapered surfaces of the adjacent ends of said sections being overlapped with said adhesive therebetween in the unset state, applying clamping pressure to the opposite sides of said assembly of laminations at a pair of directly opposite points and then progressively from said points to the end of said assembly and maintaining said clamping pressure throughout the length of said assembly until said adhesive has set.

2. A method for manufacturing a curved laminated structural building member comprising the steps of cutting a pair of parallel tapered surfaces joined by a shoulder extending therebetween on the opposite ends of a plurality of relatively short wood sections, said tapered surfaces extending sidewise of said sections, said shoulders being disposed substantially centrally of the ends of said sections and facing away from the adjacent end of said sections whereby said end portions are fully complementary with each other, coating the opposite side and end surfaces of said sections with adhesive, forming a plurality of superimposed layers each comprising a plurality of said sections in an end to end relation with overlapping and interfitting of said tapered surfaces and with said adhesive on said side and end surfaces in the unset condition, bending said assembly of layers into the desired curvature with all of said adhesive in the unset condition, applying a pressure between a pair of opposite points on opposite sides of said assembly of layers, applying clamping pressure progressively from said points to the ends of said assembly, and maintaining said pressure until the adhesive has set.

VICTOR J. WINKEL.